(12) United States Patent
Nara et al.

(10) Patent No.: US 10,316,889 B2
(45) Date of Patent: Jun. 11, 2019

(54) FINITE LINEAR MOTION GUIDE UNIT HAVING RETAINER STRAYING PREVENTION MECHANISM

(71) Applicant: NIPPON THOMPSON CO., LTD., Tokyo (JP)

(72) Inventors: Tsuguyoshi Nara, Mino (JP); Masashi Matsui, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/642,625

(22) Filed: Jul. 6, 2017

(65) Prior Publication Data
US 2018/0010634 A1    Jan. 11, 2018

(30) Foreign Application Priority Data

Jul. 6, 2016  (JP) ................. 2016-133953

(51) Int. Cl.
*F16C 29/04* (2006.01)
*F16C 33/46* (2006.01)

(52) U.S. Cl.
CPC ........ *F16C 29/043* (2013.01); *F16C 33/4605* (2013.01); *F16C 33/4635* (2013.01); *F16C 2226/12* (2013.01)

(58) Field of Classification Search
CPC .... F16C 29/005; F16C 29/041; F16C 29/043; F16C 19/04; F16C 33/467; F16C 33/4676; F16C 33/4605; F16C 33/4635; F16C 2226/12
See application file for complete search history.

(56) References Cited

U.S. PATENT DOCUMENTS

| 3,251,118 | A | * | 5/1966 | Pitner | ..................... F16C 19/46 |
| | | | | | 29/896.6 |
| 3,815,293 | A | * | 6/1974 | Karbowski | .............. B23Q 1/40 |
| | | | | | 384/53 |
| RE31,497 | E | * | 1/1984 | Nelsen | .................. B30B 15/041 |
| | | | | | 384/53 |
| 4,874,194 | A | * | 10/1989 | Borcea | .................. B25J 15/026 |
| | | | | | 294/119.1 |

(Continued)

FOREIGN PATENT DOCUMENTS

| JP | 2003028157 A | 1/2003 |
| JP | 2006183821 A | 7/2006 |
| JP | 2012202458 A | 10/2012 |

*Primary Examiner* — Alan B Waits
(74) *Attorney, Agent, or Firm* — Browdy and Neimark, PLLC

(57) ABSTRACT

In a finite linear motion guide unit, a retainer for retaining rollers rolling between guide members is formed into a V-like shape to thereby increase a rated load. A first guide member is formed into a V-like concave form, and a second guide member is formed into a V-like convex form. Needle rollers are retained by the V-shaped retainer and roll on a raceway formed by facing surfaces of the guide members. The V-shaped retainer includes a pair of roller retainer plate portions for retaining the needle rollers, and a retainer connection portion. A retainer straying prevention mechanism is composed of a pinion disposed in a cross-opening, and racks disposed on the guide members and meshing with the pinion.

5 Claims, 13 Drawing Sheets

(56) References Cited

U.S. PATENT DOCUMENTS

| | | | | | |
|---|---|---|---|---|---|
| 4,998,346 | A * | 3/1991 | Behrens | | F16C 13/006 29/898.061 |
| 5,133,608 | A * | 7/1992 | Yamaguchi | | B60B 33/04 384/47 |
| 5,427,454 | A * | 6/1995 | Tsuboi | | F16C 29/041 384/47 |
| 5,513,916 | A * | 5/1996 | Takei | | F16C 29/004 384/55 |
| 6,155,719 | A * | 12/2000 | Edelmann | | F16C 29/041 384/47 |
| 6,361,309 | B1 * | 3/2002 | Burzynski | | B29C 45/2628 249/175 |
| 6,971,797 | B2 * | 12/2005 | Obara | | F16C 29/041 384/47 |
| 7,210,849 | B2 * | 5/2007 | Yamazaki | | F16C 29/041 384/47 |
| 8,206,038 | B2 * | 6/2012 | Kanoh | | F16C 29/041 384/47 |
| 8,360,644 | B2 * | 1/2013 | Kanoh | | F16C 33/541 384/47 |
| 8,573,847 | B2 * | 11/2013 | Lee | | F16C 29/041 384/47 |
| 9,784,314 | B2 * | 10/2017 | Ng | | F16C 33/46 |
| 2002/0107605 | A1 * | 8/2002 | Serizawa | | F16C 29/04 700/159 |
| 2002/0114546 | A1 * | 8/2002 | Vegh | | F16C 29/041 384/51 |
| 2003/0016890 | A1 * | 1/2003 | Tsuboi | | F16C 29/041 384/51 |
| 2003/0108256 | A1 * | 6/2003 | Kamimura | | F16C 29/041 384/51 |
| 2004/0156565 | A1 * | 8/2004 | Obara | | F16C 29/041 384/51 |
| 2005/0029211 | A1 * | 2/2005 | Mine | | F16C 29/005 211/183 |
| 2006/0202463 | A1 * | 9/2006 | Schwarzbich | | B62D 1/185 280/775 |
| 2007/0201778 | A1 * | 8/2007 | Kakei | | F16C 29/041 384/51 |
| 2010/0247007 | A1 * | 9/2010 | Kanoh | | F16C 29/041 384/57 |
| 2012/0014628 | A1 * | 1/2012 | Kanoh | | F16C 33/541 384/51 |
| 2012/0163741 | A1 * | 6/2012 | Lee | | F16C 29/041 384/51 |
| 2012/0243811 | A1 * | 9/2012 | Kano | | F16C 29/041 384/51 |
| 2014/0270601 | A1 * | 9/2014 | Chen | | F16C 29/001 384/15 |
| 2015/0043862 | A1 * | 2/2015 | Kajikawa | | F16C 33/4676 384/572 |
| 2016/0319865 | A1 * | 11/2016 | Nara | | F16C 29/041 |

* cited by examiner

FIG. 11
(a)
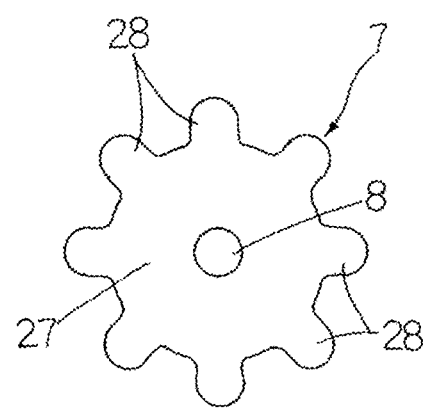
(b)
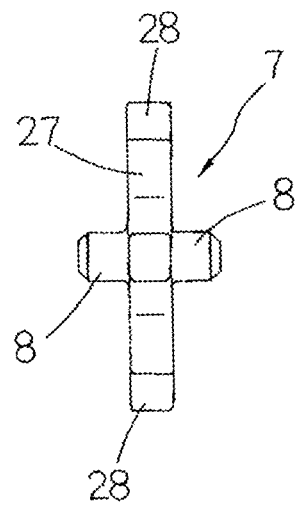

FIG. 13
(a)
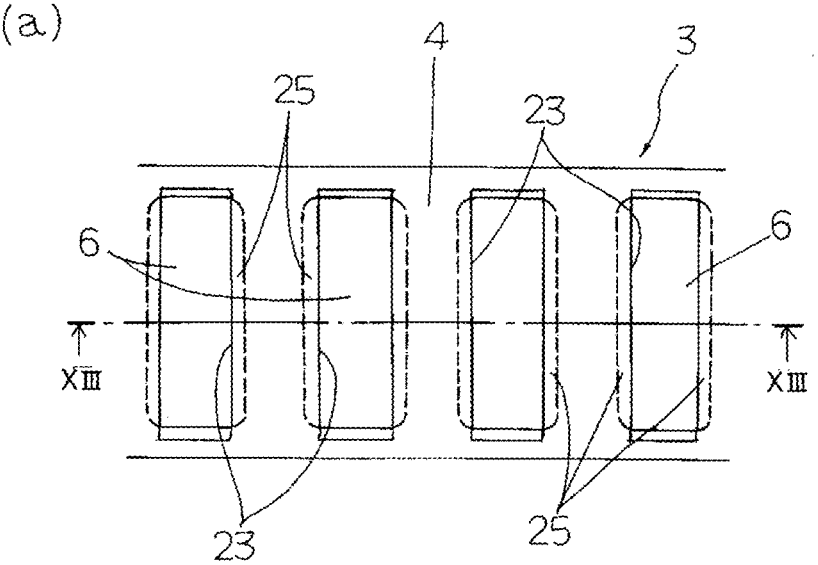
(b)
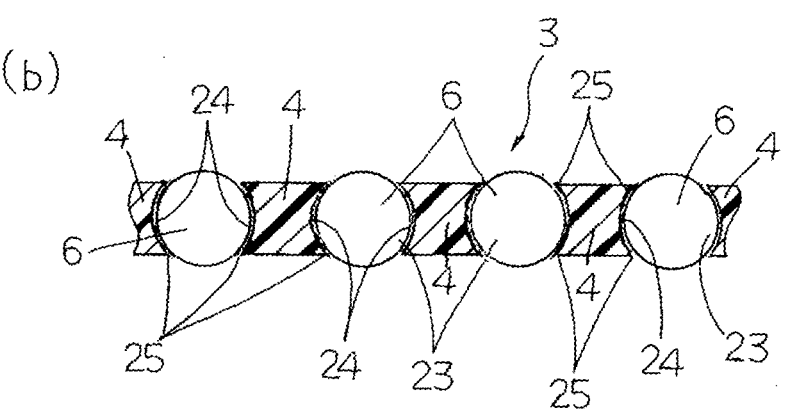

FIG. 14
(a)
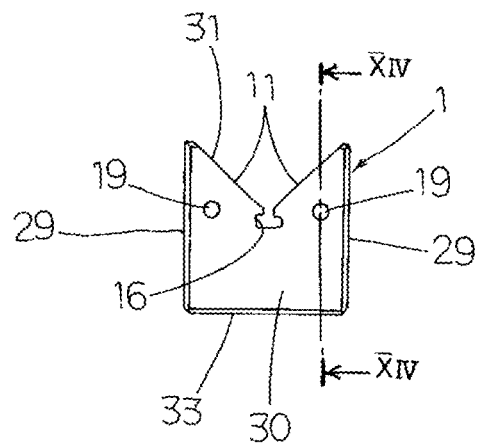
(b)
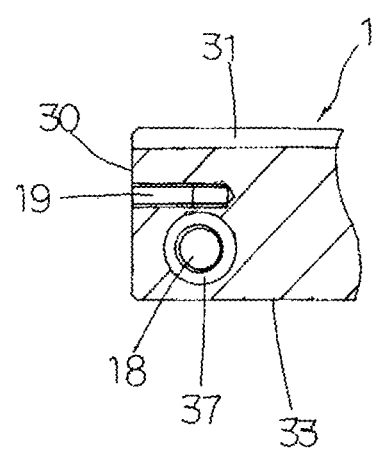

FINITE LINEAR MOTION GUIDE UNIT HAVING RETAINER STRAYING PREVENTION MECHANISM

FIELD OF THE INVENTION

The present invention relates to a finite linear motion guide unit having a mechanism for preventing a retainer from straying or wandering in the longitudinal direction of a guide member (hereinafter referred to as a "retainer straying prevention mechanism"). The finite linear motion guide unit includes a pair of guide members, a plurality of needle rollers disposed between the guide members and serving as rolling elements, a retainer for retaining the needle rollers, and the retainer straying prevention mechanism in the form of a rack-and-pinion mechanism.

BACKGROUND OF THE INVENTION

In recent years, a linear motion guide unit has been used in sliding sections of semiconductor fabrication systems, machine tools, assembling apparatus, robots, etc. As a result of acceleration of a reduction in size and sophistication of electronics, strong demand has arisen for the linear motion guide unit to be small or compact in size, to provide high accuracy and high load capacity, and to be usable for applications involving high speed or high acceleration and deceleration. Conventionally, strong demand has arisen for a finite linear motion guide unit to be small in size, to provide high load capacity, to be usable for applications involving high speed or high acceleration and deceleration, and to provide easy assembly, for example. In order to prevent the retainer from straying or wandering in relation to the guide members, various mechanisms for preventing the retainer from straying or wandering in the longitudinal direction of the guide members are available for the finite linear motion guide unit. For example, the finite linear motion guide unit disclosed in Japanese Patent Application Laid-Open No. 2003-28157 is configured such that a pair of racks disposed on respective guide members, and a pinion disposed in a plate-like retainer mesh with each other to correct the relative position of the retainer, thereby preventing the retainer from straying or wandering.

According to the cross-roller finite linear motion guide unit disclosed in Japanese Patent Application Laid-Open No. 2012-202458 of the corresponding patent application filed by the applicant of the present invention, the retainer for retaining rollers serving as rolling elements between the guide members is reduced in longitudinal deflection or bend, and roller-retaining means are provided in respective windows of the retainer plate to thereby reduce the disposition pitch of the rollers, thereby increasing the number of the rollers disposed over a predetermined length. The retainer plate is formed of a synthetic resin integrally with a holder portion into which the pinion is fitted. The retainer plate has the windows into which the respective rollers are inserted such that the axes of the rollers are orthogonal to the longitudinal direction and inclined from a main surface at an angle of 45°. A portion of the wall surface of each window which faces the end surface of the roller is formed into a bearing edge which covers a portion of the end surface of the roller. Rims are formed at longitudinal opposite side ends, respectively, of the retainer plate in such a manner as to extend along the longitudinal direction and to protrude from the main surface, for reducing deflection.

The sliding device disclosed in Japanese Patent Application Laid-Open No. 2006-183821 restrains a micro-slip phenomenon without reducing the number of rolling elements retained by a rolling-element retainer. In the sliding device, the retainer for retaining the needle rollers is formed into a V-like shape. The V-shaped retainer is configured such that a first retainer portion for retaining one rolling-element group and a second retainer portion for retaining the other rolling-element group are connected at a connection portion and such that an engagement member is provided in a substantially central region of the connection portion. Protrusions of the engagement member are sequentially engaged with recesses formed in a shaft and a load path member which forms a load path in cooperation with the shaft.

However, in the cross-roller finite linear motion guide unit disclosed in Japanese Patent Application Laid-Open No. 2012-202458, in order to increase the width of contact between a roller and the raceway surface by increasing the depth of the raceway groove, in the band-plate-like retainer plate, the elliptic windows in which the rollers are disposed respectively have the respective bearing edges for retaining the rollers, and the pinion-and-holder assembly is attached into an opening of the retainer plate. Also, in the cross-roller finite linear motion guide unit, the retainer plate is formed of a synthetic resin integrally with the holder portion for holding the pinion; rims are formed respectively on longitudinal sides of the retainer plate located on opposite sides with respect to the width direction for reducing deflection of the retainer plate; and detachment of the rollers from the retainer plate in the course of assembly is structurally prevented. However, the retainer plate is not formed into a V-like shape; i.e., an idea of increasing a rated load is not employed. Meanwhile, the retainer disclosed in Japanese Patent Application Laid-Open No. 2006-183821 is formed into a V-like shape. However, a rack-and-pinion mechanism is not employed as a retainer straying prevention mechanism. Instead, the engagement member has a large number of protrusions formed on its outer cylindrical surface, and recesses to be sequentially engaged with the protrusions are formed along the load path. This structure involves complication in manufacture.

SUMMARY OF THE INVENTION

The present invention has been conceived to solve the above problem, and an object of the invention is to provide a finite linear motion guide unit having the following structure: a V-type concave guide member and a V-type convex guide member are disposed in a mutually facing manner; a V-shaped retainer which bears needle rollers is disposed between the facing surfaces of the guide members; and the retainer is provided with a rack-and-pinion mechanism serving as a retainer straying prevention mechanism. The finite linear motion guide unit is characterized in that: the retainer is a V-shaped retainer such that roller retainer plate portions disposed in parallel with each other and a retainer connection portion disposed therebetween are integrally connected; a pinion is disposed in a cross-opening formed in the retainer; the roller retainer plate portions have windows formed therein for bearing respective needle rollers; and thus the number of the needle rollers loaded in the retainer is increased to thereby increase a rated load or load capacity.

Means to Solve the Problems

The present invention provides a finite linear motion guide unit comprising: a first guide member having a pair of first raceway surfaces having a V-shaped concave cross section and formed on a first facing surface extending in a longitudinal direction; a second guide member having a pair of second raceway surfaces having a V-shaped convex cross section, formed on a second facing surface extending in the longitudinal direction, and fitted to the first raceway surfaces of the first guide member; a plurality of needle rollers serving as rolling elements and disposed and rolling between the first raceway surfaces and the second raceway surfaces; and a retainer disposed between the first raceway surfaces and the second raceway surfaces and having windows for rotatably bearing the respective needle rollers disposed at predetermined longitudinal intervals. The retainer includes a pair of roller retainer plate portions retaining the needle rollers in the windows and extending in the longitudinal direction, and a retainer connection portion integrally connecting the roller retainer plate portions along the longitudinal direction such that the roller retainer plate portions and the retainer connection portion form a V-like shape. The retainer connection portion has a cross-opening composed of a pinion-fitting opening extending in the longitudinal direction and adapted to fit a pinion therein, and a pinion-shaft-fitting opening orthogonal to the pinion-fitting opening and adapted to fit a shaft of the pinion therein. Racks are fitted respectively in a first rack-fitting groove formed in the first guide member between the first raceway surfaces and in a second rack-fitting groove formed in the second guide member between the second raceway surfaces. Teeth of the pinion disposed rotatably in the cross-opening formed in the retainer connection portion mesh with the racks disposed respectively in the first rack-fitting groove and in the second rack-fitting groove to thereby form a retainer straying prevention mechanism.

Preferably, the pinion-shaft-fitting opening of the cross-opening into which the shaft of the pinion is fitted extends into the roller retainer plate portions.

Preferably, the roller retainer plate portions and the retainer connection portion of the retainer each assume the shape of a flat plate, and one roller retainer plate portion and the other roller retainer plate portion are integrally connected at right angles to each other through the retainer connection portion.

Preferably, end stop plates are attached to respective end surfaces of the first guide member and the second guide member in order to prevent the racks from coming out. Further, preferably, the end stop plates are formed into a V-like concave shape or a circular shape according to the shapes of the end surfaces of the first guide member and the second guide member.

Preferably, mounting holes used to mount a mating member, formed in the first guide member and in the second guide member, and extending in a width direction and threaded attachment holes used to attach the end stop plates, formed in the first guide member and in the second guide member, and extending in the longitudinal direction, are located in a mutually noninterfering relation.

Preferably, the roller retainer plate portions have roller-bearing edges formed respectively on edges of window arcuate surfaces of the windows for bearing rolling contact surfaces of the needle rollers. Further, preferably, the needle rollers are pressed into the respective windows of the retainer by elastically deforming the roller-bearing edges of the roller retainer plate portions to thereby be mounted in the windows.

Preferably, the shaft of the pinion is pressed into the pinion-shaft-fitting opening of the cross-opening formed in the retainer by elastically deforming an edge of the pinion-shaft-fitting opening to thereby mount the pinion to the retainer.

Preferably, the rack is formed into the form of a ladder from a pair of brace portions and a plurality of rack teeth disposed at predetermined intervals between the brace portions, and the teeth of the pinion mesh with openings between the rack teeth.

Preferably, a width of the second guide member orthogonal to a sliding direction is smaller than that of the first guide member.

Preferably, the retainer, the pinion, and the racks are formed of a synthetic resin.

Effect of the Invention

As mentioned above, the finite linear motion guide unit of the present invention has the retainer straying prevention mechanism, and the first guide member having the V-like concave form is fitted to the second guide member having the V-like convex form such that the needle rollers borne by the V-shaped retainer intervene therebetween. Thus, the finite linear motion guide can support loads applied vertically and horizontally to the first and second guide members. Also, since a plurality of the needle rollers are disposed in the two parallel roller retainer plate portions of the retainer, load to be applied can be increased. Since the retainer retains two rows of the needle rollers for supporting a predetermined applied load, in the case where the number of needle rollers is predetermined, the overall length of the retainer can be reduced, and the maximum stroke length can be increased. Particularly, the cross-opening is formed in a substantially central region of the retainer connection portion for connecting the parallel roller retainer plate portions of the retainer, and the pinion which partially constitutes the retainer straying prevention mechanism is rotatably fitted into the cross-opening, whereby the pinion is reliably supported by the retainer. Specifically, the cross-opening formed in the retainer is composed of the pinion-fitting opening into which the pinion is fitted, and the pinion-shaft-fitting opening into which the pinion shaft is rotatably fitted. Particularly, the pinion-shaft-fitting opening includes an extension opening extending from the retainer connection portion into the roller retainer plate portions to thereby lengthen a shaft support length, whereby the pinion shaft can be supported by the retainer in a stably rotatable manner.

Also, the racks disposed respectively in the first and second rack-fitting grooves formed in the first and second guide members are appropriately fixed to the first and second guide members by the end stop plates. Therefore, as a result of the pinion supported by the retainer meshing with a pair of the racks, the retainer is prevented from straying or wandering in relation to the first and second guide members, whereby the relative sliding motion between the first guide member and the second guide member is performed smoothly. Further, in the finite linear motion guide unit, since the second guide member is smaller in width than the first guide member, the second guide member can be reduced in weight as compared with the first guide member. Accordingly, for example, the first guide member can be stably mounted on a base, whereas the second guide member can be disposed stably on the first guide member. Further, in the case where the second guide member is higher in moving speed than the first guide member, an inertial force of the second guide member can be reduced, whereby a sliding movement of the second guide member can be controlled with high precision to thereby enhance response. Also, in retaining the needle rollers in the respective windows formed in the retainer, since edges of the windows are elastically deformed for bearing the needle rollers in the windows of the retainer, the needle rollers are retained in the retainer in a reliably rotatable manner, whereby precise, reliable relative sliding can be performed between the first guide member and the second guide member.

BRIEF DESCRIPTION OF THE DRAWING

FIG. 11 is a set of views showing the pinion of the retainer straying prevention mechanism, wherein FIG. 11-(*a*) is a plan view, and FIG. 11-(*b*) is a side view;

FIG. 13 is a set of views showing a state in which the needle rollers are born in respective windows formed in the retainer, wherein FIG. 13-(*a*) is a partial plan view, and FIG. 13-(*b*) is a sectional view taken along line XIII-XIII of FIG. 13-(*a*);

FIG. 14 is a set of views showing a first guide member in the finite linear motion guide unit, wherein FIG. 14-(*a*) is an end view of the first guide member, and FIG. 14-(*b*) is a sectional view taken along line XIV-XIV of FIG. 14-(*a*);

DETAILED DESCRIPTION OF THE EMBODIMENT

Figure 1:
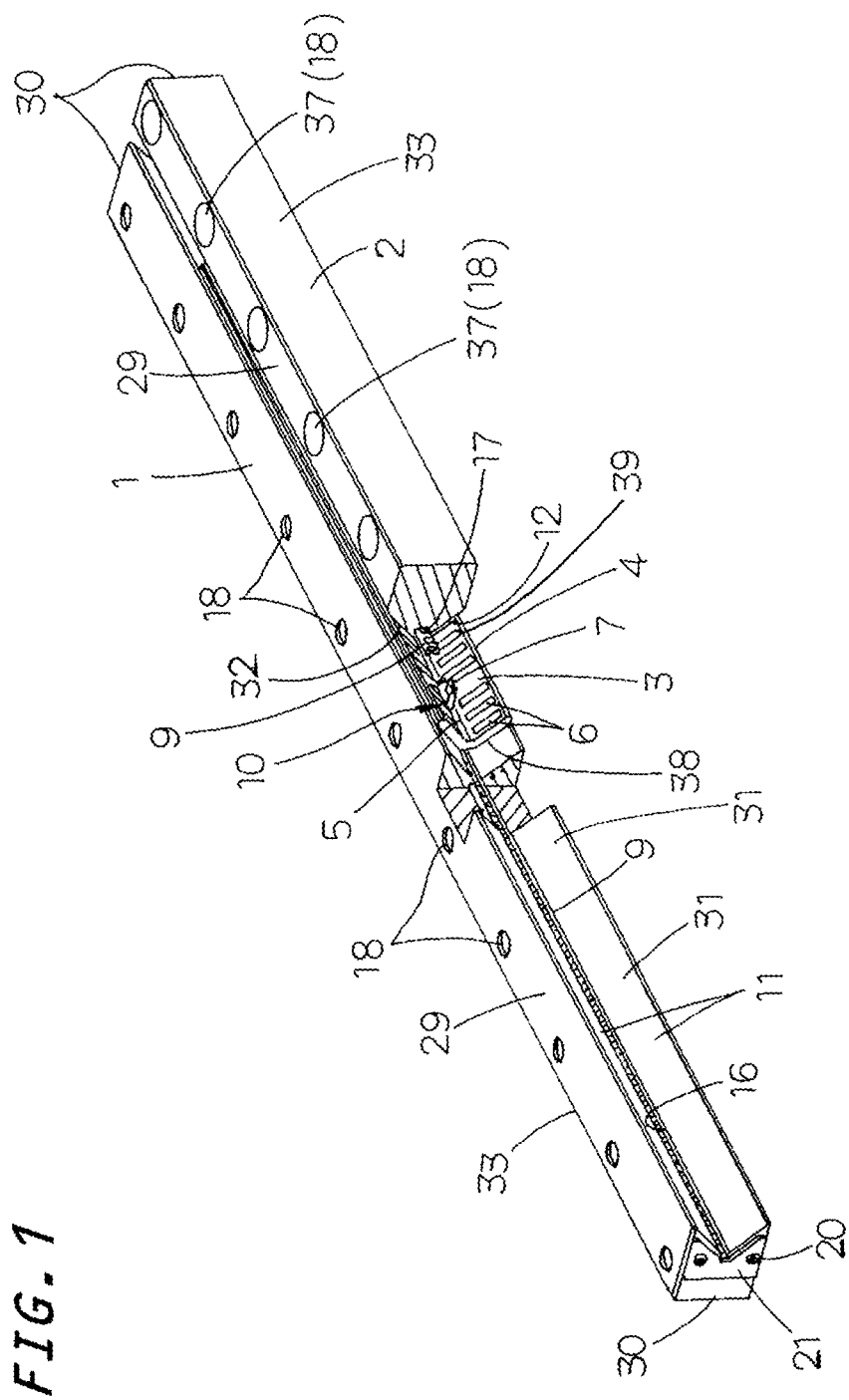
FIG. 1 is a perspective view, including a partial section, showing an embodiment of a finite linear motion guide unit according to the present invention.
Figure 2:
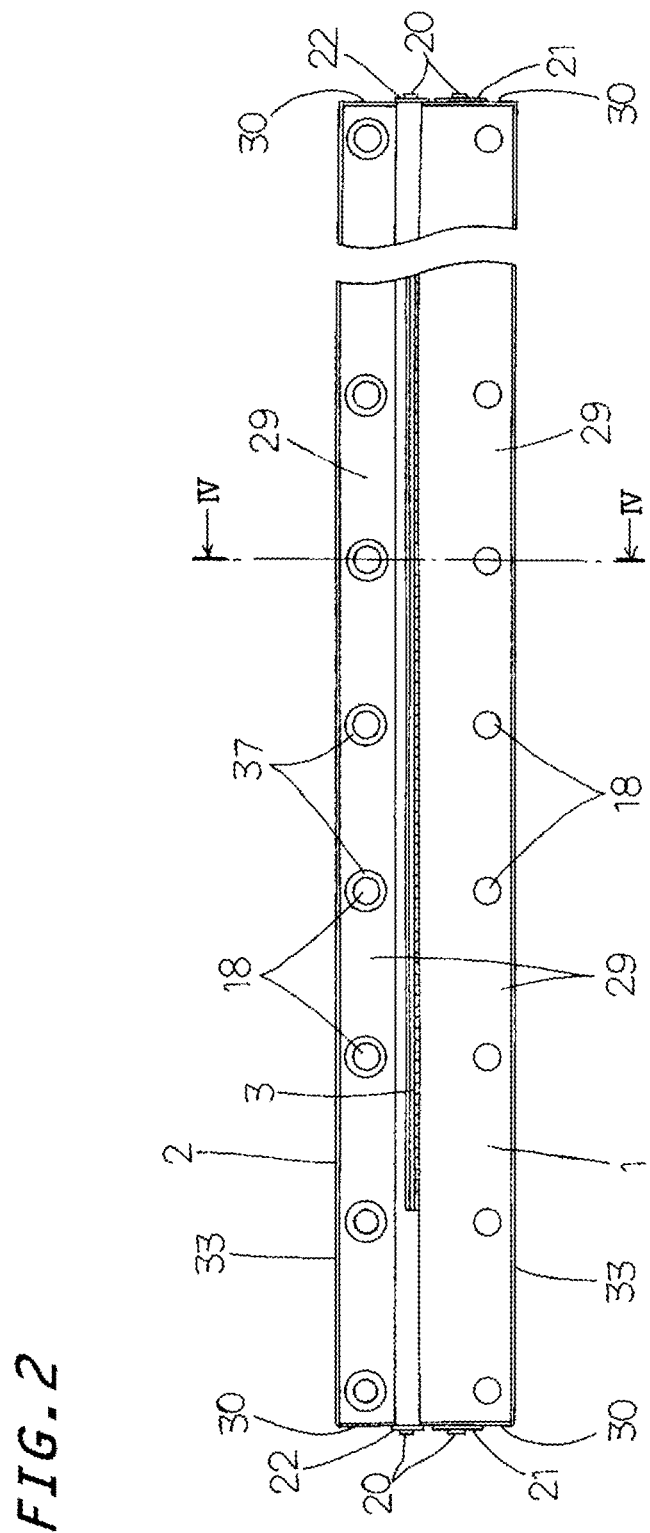
FIG. 2 is a plan view of the finite linear motion guide unit of FIG. 1.
Figure 3:
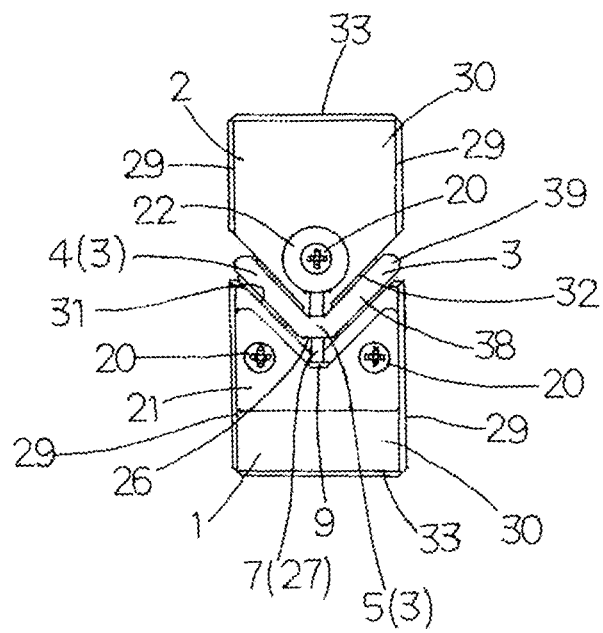
FIG. 3 is an end view of the finite linear motion guide unit of FIG. 1.
Figure 4:
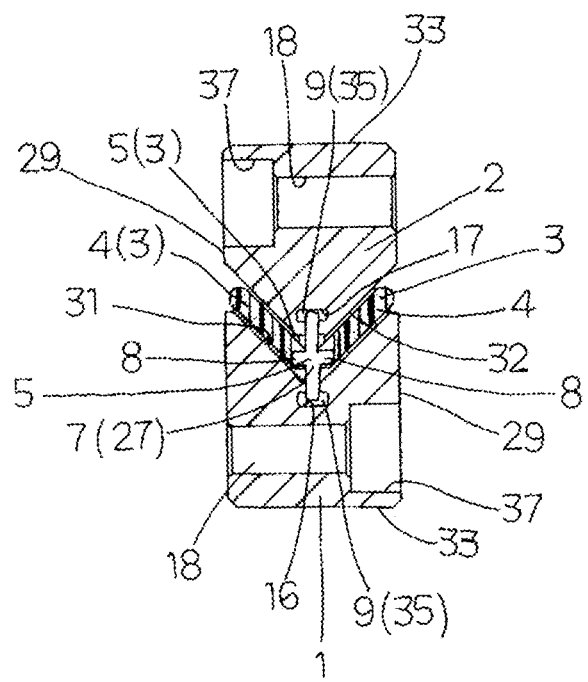
FIG. 4 is a sectional view of the finite linear motion guide unit taken along line IV-IV of FIG. 2.
Figure 5:
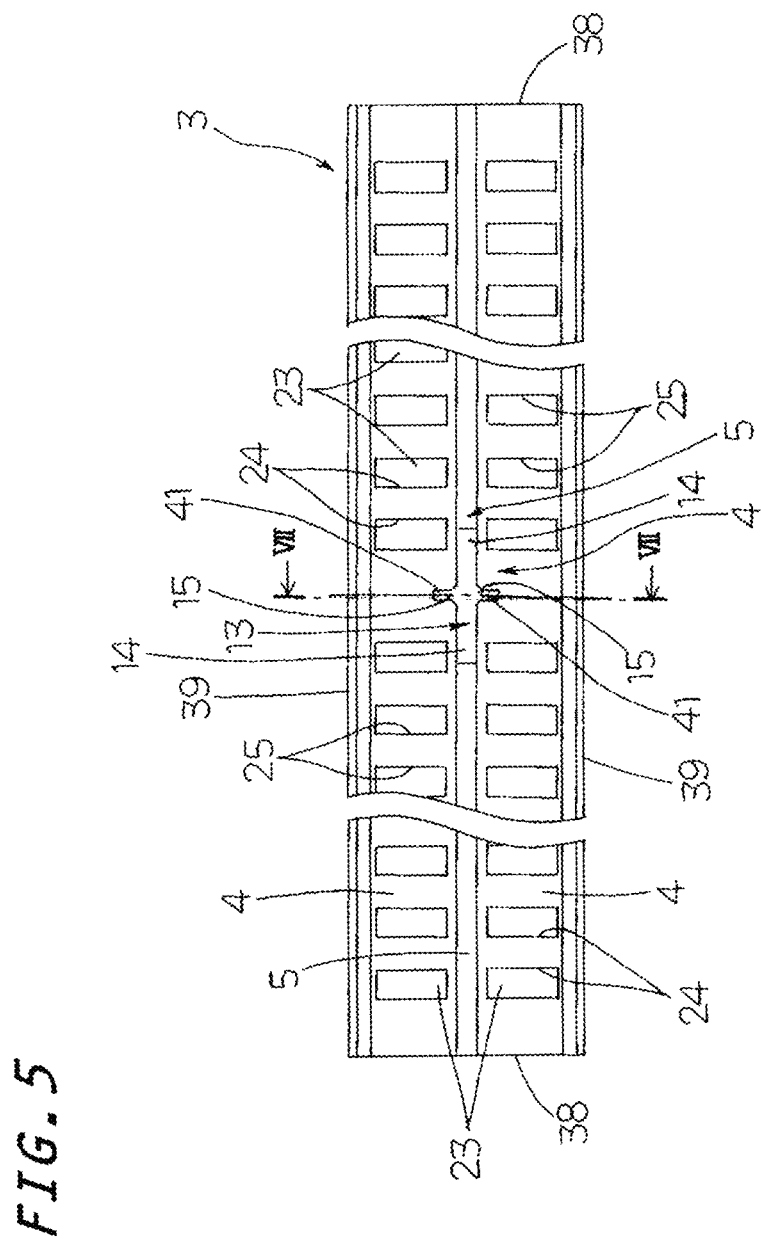
FIG. 5 is a plan view of a retainer incorporated in the finite linear motion guide.
Figure 6:
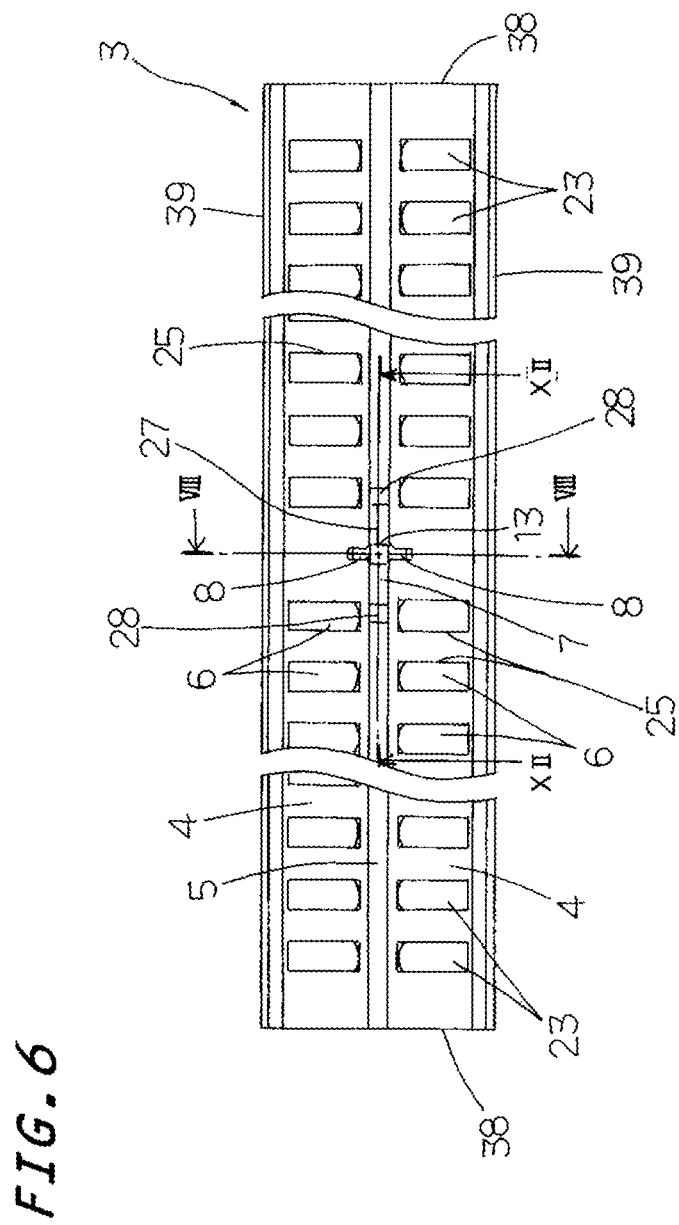
FIG. 6 is a plan view showing a state in which needle rollers and a pinion of a retainer straying prevention mechanism are mounted in the retainer of FIG. 5.
Figure 7:
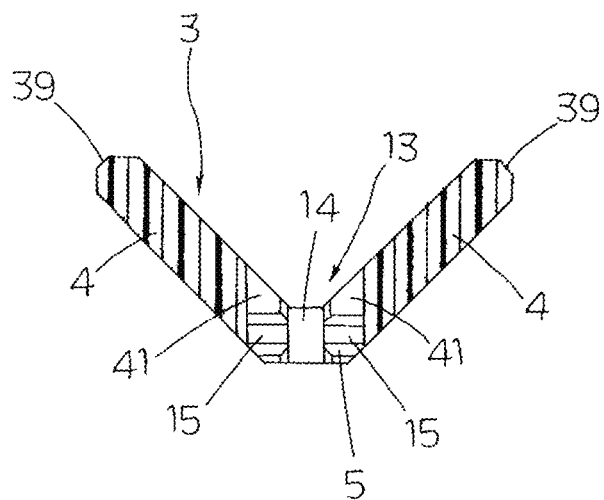
FIG. 7 is a sectional view of the retainer taken along line VII-VII of FIG. 5.
Figure 8:
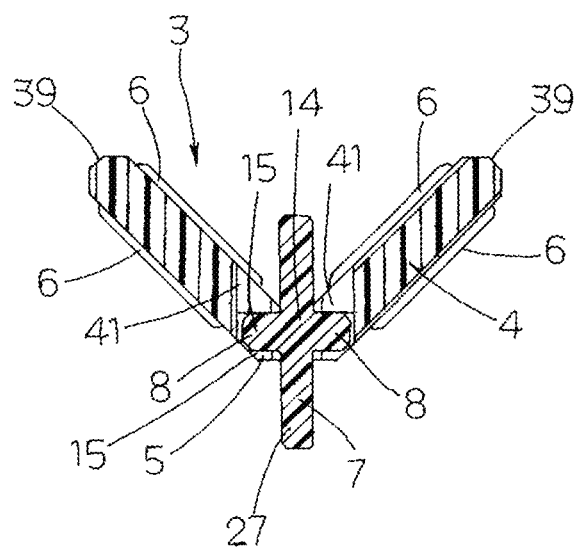
FIG. 8 is a sectional view taken along line VIII-VIII of FIG. 6, showing the retainer, the pinion, and the needle rollers.
Figure 9:
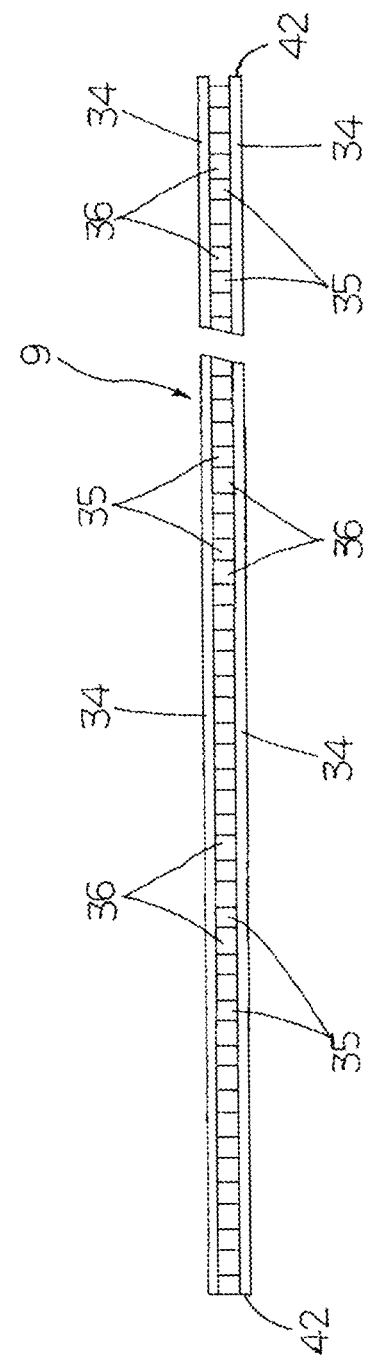
FIG. 9 is a plan view showing a rack for use in the finite linear motion guide unit.
Figure 10:
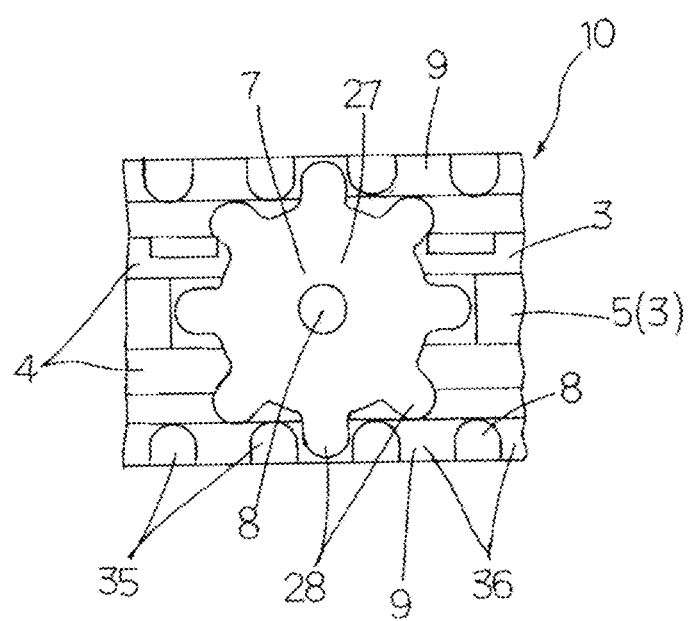
FIG. 10 is an explanatory view showing a state of meshing between the pinion and the racks which constitute the retainer straying prevention mechanism provided in the finite linear motion guide unit.
Figure 12:
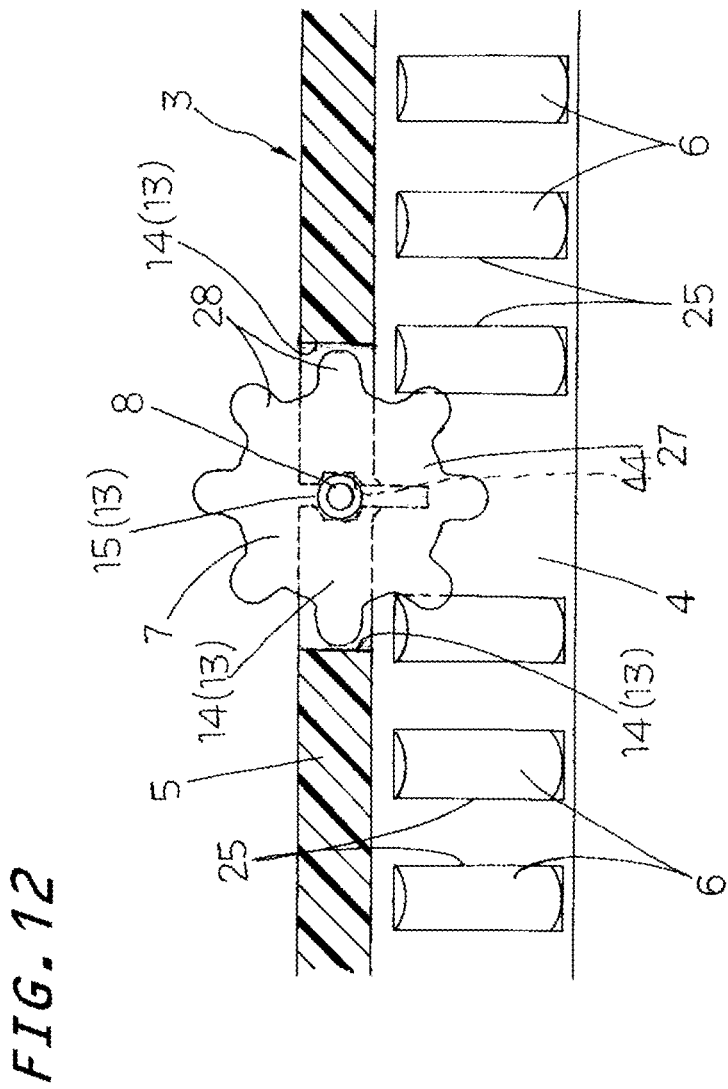
FIG. 12 is a sectional view of the retainer taken along line XII-XII of FIG. 6.

A finite linear motion guide unit according to the present invention has a retainer straying prevention mechanism and can be preferably used in sliding sections of semiconductor fabrication systems, machine tools, assembling apparatus, robots, etc.

Embodiments of the finite linear motion guide unit according to the present invention will next be described with reference to the drawings. First, an embodiment of the finite linear motion guide unit will be described with reference to FIGS. 1 to 4. The finite linear motion guide unit is configured as follows: a pair of guide members 1 and 2 having respective elongated longitudinal sides 33 is disposed such that a facing surface 31 (first facing surface) of the guide member 1 and a facing surface 32 (second facing surface) of the guide member 2 face each other with a predetermined distance away from each other, and the guide members 1 and 2 can slide in relation to each other through a plurality of needle rollers 6 serving as rolling elements. The finite linear motion guide unit includes the V-type concave guide member 1 (first guide member), the V-type convex guide member 2 (second guide member), a plurality of needle rollers 6 serving as rolling elements, and a retainer 3 having a V-shaped cross section. The V-type concave guide member 1 has a pair of raceway surfaces 11 (first raceway surfaces) having a V-shaped concave cross section and formed on the facing surface 31 extending in a longitudinal direction. The V-type convex guide member 2 has a pair of raceway surfaces 12 (second raceway surfaces) having a V-shaped convex cross section, formed on the facing surface 32 extending in the longitudinal direction, and fitted to the raceway surfaces 11 of the guide member 1. The needle rollers 6 are disposed and roll between the raceway surfaces 11 and the raceway surfaces 12. The retainer 3 is disposed between the raceway surfaces 11 and the raceway surfaces 12 and has windows 23 for rotatably supporting the respective needle rollers 6 disposed at predetermined longitudinal intervals. The retainer 3 includes a pair of roller retainer plate portions 4 retaining the needle rollers 6 in the windows 23 and having longitudinal side end surfaces 39 extending in the longitudinal direction between end surfaces 38, and a retainer connection portion 5 integrally connecting the roller retainer plate portions 4 along the longitudinal direction. The roller retainer plate portions 4 and the retainer connection portion 5 form a V-like shape. The retainer connection portion 5 has a cross-opening 13 composed of a pinion-fitting opening 14 extending in the longitudinal direction and adapted to fit a pinion 7 therein, and a pinion-shaft-fitting opening 15 orthogonal to the pinion-fitting opening 14 and adapted to fit a shaft 8 of the pinion 7 therein. The finite linear motion guide unit has racks 9 fitted respectively in a rack-fitting groove 16 (first rack-fitting groove) formed in a bottom of the guide member 1 between the raceway surfaces 11 and in a rack-fitting groove 17 (second rack-fitting groove) formed in a ridge of the guide member 2 between the raceway surfaces 12. Particularly, in the finite linear motion guide unit, teeth 28 formed on a disc 27 of the pinion 7 disposed rotatably in the cross-opening 13 formed in the retainer connection portion 5 mesh with the racks 9 disposed respectively in the rack-fitting groove 16 and in the rack-fitting groove 17 to thereby form a retainer straying prevention mechanism.

The pinion-shaft-fitting opening 15 of the cross-opening 13 formed in the retainer 3 into which the shaft 8 of the pinion 7 is fitted extends into the roller retainer plate portions 4. In other words, the cross-opening 13 formed in the retainer 3 is composed of the pinion-fitting opening 14 into which the pinion 7 is fitted, and the pinion-shaft-fitting opening 15 into which the shaft 8 of the pinion 7 is rotatably fitted. Particularly, the pinion-shaft-fitting opening 15 includes an extension opening 41 extending from the retainer connection portion 5 into the roller retainer plate portions 4 to thereby lengthen a shaft support length. Further, opposite side wall surfaces of the pinion-shaft-fitting opening 15 of the cross-opening 13 which support the shaft 8 of the pinion 7 are formed into trapezoidal or semicircular recesses 44, whereby the shaft 8 of the pinion 7 can be supported in the retainer 3 in a stably, smoothly rotatable manner. Therefore, the shaft 8 of the pinion 7 can rotate in the retainer 3 stably and smoothly, thereby enabling exhibition of the function of the retainer straying prevention mechanism 10.

The retainer 3 is formed of a synthetic resin by molding; the roller retainer plate portions 4 and the retainer connection portion 5 of the retainer 3 each assume the shape of a flat plate having a flat surface 26; and one roller retainer plate portion 4 and the other roller retainer plate portion 4 are integrally connected at right angles to each other through the retainer connection portion 5. In order to bear the needle rollers 6, the roller retainer plate portions 4 have a plurality of the windows 23 formed therein at predetermined intervals; the retainer connection portion 5 has the cross-opening 13 formed therein for rotatably fitting the pinion 7 therein; and the window 23 is not formed in a region of each roller retainer plate portion 4 where the pinion-shaft-fitting opening 15 of the cross-opening 13 is formed; instead, the extension opening 41 is formed in the region for increasing the length of the pinion-shaft-fitting opening 15. The shaft 8 of the pinion 7 is pressed into the pinion-shaft-fitting opening 15 by elastically deforming an edge of the pinion-shaft-fitting opening 15; further, the pinion 7 is disposed rotatably and stably in the retainer connection portion 5 of the retainer 3, thereby enabling exhibition of the function of the retainer straying prevention mechanism 10. That is, the shaft 8 of the pinion 7 is pressed into the cross-opening 13 formed in the retainer 3 by elastically deforming an edge of the cross-opening 13 located at the retainer connection portion 5, whereby the pinion 7 is stably mounted in the retainer 3. Since the retainer connection portion 5 of the retainer 3 assumes the shape of a flat plate having the flat surface 26, a gap between the retainer connection portion 5 and the V-groove of the guide member 1 is increased, whereby the gap can function as an oil sump. Also, since the retainer connection portion 5 assumes the shape of a flat plate having the flat surface 26, the pinion 7 can be easily fitted into the cross-opening in a good posture.

Also, in the finite linear motion guide unit, end stop plates 21 and 22 are attached to respective end surfaces 30 of the guide member 1 and the guide member 2 in order to prevent the racks 9 from coming out. Further, the end stop plate 21 attached to the end surface 30 of the guide member 1 has a V-like concave shape corresponding to the shape of the end surface 30, whereas the end stop plate 22 attached to the end surface 30 of the guide member 2 has the shape of a circular washer. The shapes of the end stop plates 21 and 22 are not limited thereto so long as the shapes can fix the end surfaces 42 of the racks 9 mounted in the guide members 1 and 2 and so long as threaded attachment holes 19 formed in the end surfaces 30 of the guide members 1 and 2 for fixing the end stop plates 21 and 22 can be formed at such positions as not to interfere with mounting holes 18 which are formed in respective spot facings 37 formed on mounting surfaces 29 of the guide members 1 and 2 and which are used to mount a mating member (not shown) such as a workpiece or an instrument. That is, the mounting holes 18 used to mount a mating member, formed in the guide member 1 and in the guide member 2, and extending in a width direction, and the threaded attachment holes 19 used to attach the end stop plates 21 and 22, formed in the guide member 1 and in the second guide member 2, and extending in the longitudinal direction are, located in a mutually noninterfering relation. The end stop plate 21 attached to the guide member 1 has a V-like concave shape, and the threaded attachment holes 19 are formed at opposite sides of the V-like concave. The end stop plate 22 attached to the guide member 2 has the shape of a circular washer, and the threaded attachment hole 19 is formed at a position corresponding to the center of the circle.

Also, in the finite linear motion guide unit, the roller retainer plate portions 4 of the retainer 3 have roller engagement portions, i.e., roller-bearing edges 25 formed respectively on edges of window arcuate surfaces 24 of the windows 23 for bearing rolling contact surfaces 40 of the needle rollers 6. Each window 23 has a circular section defined by the facing window arcuate surfaces 24. Further, the needle rollers 6 are pressed into the respective windows 23 of the retainer 3 by elastically deforming the roller-bearing edges 25 of the roller retainer plate portions 4 to thereby be mounted in the windows 23. Since the windows 23 each have a circular section, the roller-bearing edges 25 elastically deform at their edge portions, whereby the roller-bearing edges 25 can stably and rotatably bear the needle rollers 6.

The racks 9 are each formed into the form of a ladder from a pair of brace portions 34 and a plurality of rack teeth 35 disposed at predetermined intervals between the brace portions 34 such that the teeth 28 of the pinion 7 mesh with openings 36 between the rack teeth 35. The racks 9 are fitted respectively into the rack-fitting groove 16 formed in the guide member 1 and into the rack-fitting groove 17 formed in the guide member 2 from the end surfaces 30 of the guide members 1 and 2. In a state in which the racks 9 are fitted into the rack-fitting grooves 16 and 17 of the guide members 1 and 2, respectively, the end stop plates 21 and 22 are fixed to the end surfaces 30 of the guide members 1 and 2, respectively, by use of screws 20, thereby fixing the racks 9 to the guide members 1 and 2.

Figure 15:
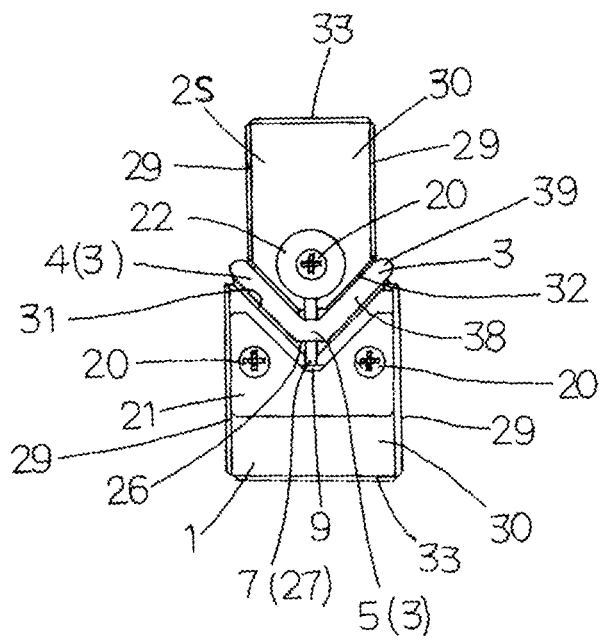
FIG. 15 is an end view corresponding to FIG. showing another embodiment of a second guide member incorporated in the finite linear motion guide unit.
Figure 16:
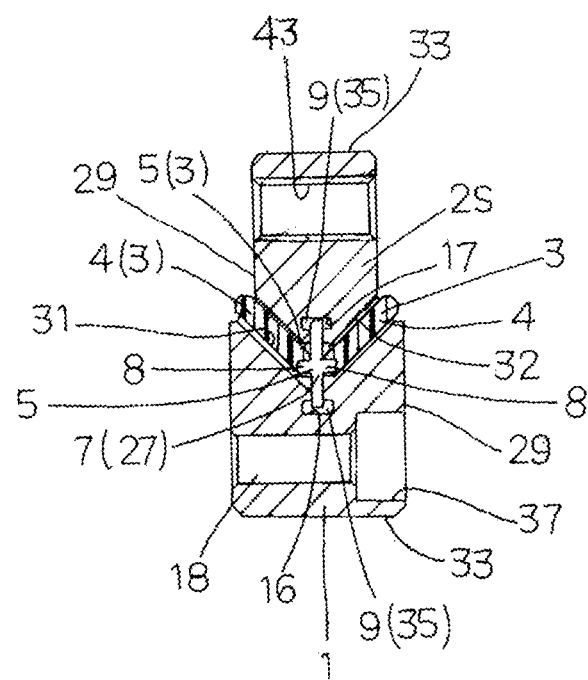
FIG. 16 is a sectional view corresponding to FIG. 4, showing the another embodiment of the second guide member incorporated in the finite linear motion guide unit.

Another embodiment of the finite linear motion guide unit will be described with reference to FIGS. 15 and 16. In the finite linear motion guide unit, the V-type concave guide member 1 has the pair of raceway surfaces 11 having a V-shaped concave cross section and formed on the facing surface 31 extending in the longitudinal direction, and a V-type convex guide member 2S has the pair of raceway surfaces 12 having a V-shaped convex cross section, formed on the facing surface 32 extending in the longitudinal direction, and fitted to the raceway surfaces 11 of the guide member 1. The guide member 2S is smaller in width orthogonal to the sliding direction than the guide member 1. In the present embodiment, the guide member 1 has mounting holes 18 formed therein, whereas the guide member 2S has threaded mounting holes 43 formed therein. The guide members 1 and 2S may selectively have mounting holes or threaded mounting holes as mounting means depending on a mating member to be mounted thereon.

In the finite linear motion guide unit, the retainer 3, the pinion 7, and the racks 9 are formed of a synthetic resin. Therefore, even though the retainer 3 has a complicated shape, the retainer 3 can be easily manufactured with high precision by use of a 3D printer, for example.

What is claimed is:
1. A finite linear motion guide unit comprising:
a first guide member having a pair of first raceway surfaces having a V-shaped concave cross section and formed on a first facing surface extending in a longitudinal direction;
a second guide member having a pair of second raceway surfaces having a V-shaped convex cross section, formed on a second facing surface extending in the longitudinal direction, and fitted to the first raceway surfaces of the first guide member;

a plurality of needle rollers serving as rolling elements and disposed and rolling between the first raceway surfaces and the second raceway surfaces; and a retainer disposed between the first raceway surfaces and the second raceway surfaces and having windows for rotatably bearing the respective needle rollers disposed at predetermined longitudinal intervals;

wherein the retainer includes a pair of roller retainer plate portions retaining the needle rollers in the windows and extending in the longitudinal direction, and a retainer connection portion integrally connecting the roller retainer plate portions along the longitudinal direction such that the roller retainer plate portions and the retainer connection portion form have a V-shape; the retainer connection portion has a cross-opening composed of a pinion-fitting opening extending in the longitudinal direction and adapted to fit a pinion therein, and a pinion-shaft-fitting opening orthogonal to the pinion-fitting opening and adapted to fit a shaft of the pinion therein; racks are fitted respectively in a first rack-fitting groove formed in the first guide member between the first raceway surfaces and in a second rack-fitting groove formed in the second guide member between the second raceway surfaces; and teeth of the pinion disposed rotatably in the cross-opening formed in the retainer connection portion mesh with the racks disposed respectively in the first rack-fitting groove and in the second rack-fitting groove to thereby form a retainer straying prevention mechanism, wherein the pinion-shaft-fitting opening of the cross-opening into which the shaft of the pinion is fitted extends into the roller retainer plate portions, wherein the roller retainer plate portions and the retainer connection portion of the retainer each assume the shape of a flat plate, and one roller retainer plate portion and the other roller retainer plate portion are integrally connected at right angles to each other through the retainer connection portion, wherein the roller retainer plate portions have roller-bearing edges formed respectively on edges of window arcuate surfaces of the windows for bearing rolling contact surfaces of the needle rollers, wherein the needle rollers are pressed into the respective windows of the retainer by elastically deforming the roller-bearing edges of the roller retainer plate portions to thereby be mounted in the windows, wherein the shaft of the pinion is pressed into the pinion-shaft-fitting opening of the cross-opening formed in the retainer by elastically deforming an edge of the pinion-shaft-fitting opening to thereby mount the pinion to the retainer, wherein the rack is formed into the form of a ladder from a pair of brace portions and a plurality of rack teeth disposed at predetermined intervals between the brace portions, and the teeth of the pinion mesh with openings between the rack teeth, and wherein the retainer, the pinion, and the racks are formed of a synthetic resin.

2. A finite linear motion guide unit according to claim 1, wherein end stop plates are attached to respective end surfaces of the first guide member and the second guide member in order to prevent the racks from coming out.

3. A finite linear motion guide unit according to claim 1, wherein the end stop plates are formed into a V-shaped concave shape or a circular shape according to the shapes of the end surfaces of the first guide member and the second guide member.

4. A finite linear motion guide unit according to claim 2, wherein mounting holes used to mount a mating member, formed in the first guide member and in the second guide member, and extending in a width direction and threaded attachment holes used to attach the end stop plates, formed in the first guide member and in the second guide member, and extending in the longitudinal direction, are located in a mutually noninterfering relation.

5. A finite linear motion guide unit according to claim 1, wherein a width of the second guide member orthogonal to a sliding direction is smaller than that of the first guide member.

* * * * *